US012528751B2

(12) United States Patent
Stemwedel et al.

(10) Patent No.: US 12,528,751 B2
(45) Date of Patent: Jan. 20, 2026

(54) ORGANIC NITROGENOUS FERTILIZERS AND METHODS OF MAKING THE SAME

(71) Applicant: Grower's Secret, Inc., Honolulu, HI (US)

(72) Inventors: Timothy Stemwedel, Hanford, CA (US); Wesley Chun, Honolulu, HI (US)

( * ) Notice: Subject to any disclaimer, the term of this patent is extended or adjusted under 35 U.S.C. 154(b) by 0 days.

(21) Appl. No.: 19/000,732

(22) Filed: Dec. 24, 2024

(65) Prior Publication Data
US 2025/0206678 A1 Jun. 26, 2025

Related U.S. Application Data

(60) Provisional application No. 63/614,667, filed on Dec. 26, 2023.

(51) Int. Cl.
*C05F 11/00* (2006.01)
*C05C 11/00* (2006.01)
(Continued)

(52) U.S. Cl.
CPC .............. *C05F 11/00* (2013.01); *C05C 11/00* (2013.01); *C05F 17/20* (2020.01); *C05F 17/40* (2020.01); *C05F 17/60* (2020.01)

(58) Field of Classification Search
CPC .......... C05F 11/00; C05F 17/20; C05F 17/40; C05F 17/60; C05F 5/00; C05F 11/10; C05C 11/00; C05G 1/00; Y02A 40/20
See application file for complete search history.

(56) References Cited

U.S. PATENT DOCUMENTS

| 3,640,725 A | 2/1972 | Sherba et al. |
| 5,077,062 A | 12/1991 | Ernster |

(Continued)

FOREIGN PATENT DOCUMENTS

| CN | 1511810 A | 7/2004 |
| CN | 107637593 A | 1/2018 |

(Continued)

OTHER PUBLICATIONS

English language abstract of foreign patent document CN1511810A, downloaded Oct. 23, 2023, available online https://patents.google.com/patent/CN1511810A/en?oq=CN1511810A.
(Continued)

*Primary Examiner* — Jennifer A Smith
(74) *Attorney, Agent, or Firm* — Sierra IP Law, PC; William K. Nelson

(57) ABSTRACT

A method for producing a liquid nitrogen fertilizer from protein-rich plant materials, such as soybeans. The method includes extracting nitrogenous compounds through an alkaline solution under controlled temperature and pH conditions, followed by enzymatic hydrolysis using proteases to break down proteins into amino acids and oligopeptides. The fertilizer composition may include additional plant-beneficial compounds, such as isoflavones, phenols, and phytoalexins, enhancing plant growth, nutrient uptake, and disease resistance. The method maximizes recovery through iterative mechanical separation and optional hydrolysis of solid fractions. The resulting organic liquid fertilizer is suitable for use in sustainable and organic farming applications, providing a nutrient-rich, environmentally friendly alternative to conventional chemical fertilizers.

20 Claims, 2 Drawing Sheets

(51) Int. Cl.
*C05F 17/20* (2020.01)
*C05F 17/40* (2020.01)
*C05F 17/60* (2020.01)

(56) References Cited

U.S. PATENT DOCUMENTS

| | | | |
|---|---|---|---|
| 5,780,439 | A | 7/1998 | Mendy et al. |
| 6,022,702 | A | 2/2000 | Tsumura et al. |
| 6,126,973 | A | 10/2000 | Tsumura et al. |
| 6,537,597 | B1 | 3/2003 | Nakamori et al. |
| 6,787,173 | B2 | 9/2004 | Akashe et al. |
| 7,705,116 | B2 | 4/2010 | Holtzapple et al. |
| 7,776,124 | B2 | 8/2010 | Binder et al. |
| 7,789,932 | B2 | 9/2010 | Anderson et al. |
| 8,268,121 | B2 | 9/2012 | Blount |
| 8,523,975 | B2 | 9/2013 | Ettlin et al. |
| 8,623,110 | B2 | 1/2014 | Bevans et al. |
| 9,034,402 | B2 | 5/2015 | Wong et al. |
| 9,133,068 | B2 | 9/2015 | Callendrello et al. |
| 9,481,611 | B2 | 11/2016 | Callendrello et al. |
| 9,850,178 | B2 | 12/2017 | Evans |
| 11,040,919 | B2 | 6/2021 | Mastache et al. |
| 11,130,716 | B2 | 9/2021 | Wang |
| 11,249,022 | B2 | 2/2022 | Herceg et al. |
| 11,518,720 | B2 | 12/2022 | Stemwedel |
| 11,753,349 | B2 | 9/2023 | Kroh |
| 2002/0090418 | A1 | 7/2002 | Prevost et al. |
| 2003/0022274 | A1 | 1/2003 | McNeil |
| 2003/0165612 | A1 | 9/2003 | Sanz Gutierrez |
| 2008/0302151 | A1 | 12/2008 | Stemwedel |
| 2009/0173122 | A1 | 7/2009 | Stemwedel |
| 2009/0211322 | A1 | 8/2009 | Skinner |
| 2011/0097448 | A1 | 4/2011 | Wong et al. |
| 2015/0191399 | A1 | 7/2015 | Dahms et al. |
| 2016/0102024 | A1 | 4/2016 | Schrader et al. |
| 2016/0236996 | A1 | 8/2016 | Chaudhry |
| 2019/0048307 | A1 | 2/2019 | Morash et al. |
| 2019/0248713 | A1 | 8/2019 | Mastache et al. |
| 2020/0113186 | A1 | 4/2020 | Morash et al. |
| 2020/0345032 | A1 | 11/2020 | Yang et al. |
| 2021/0084908 | A1 | 3/2021 | Bender |
| 2021/0137124 | A1 | 5/2021 | Thompson et al. |
| 2022/0380270 | A1 | 12/2022 | Stemwedel |
| 2023/0150894 | A1 | 5/2023 | Stemwedel |

FOREIGN PATENT DOCUMENTS

| | | |
|---|---|---|
| EP | 2537823 B1 | 10/2013 |
| EP | 3567021 B1 | 12/2022 |
| JP | 4635520 B2 | 2/2011 |
| WO | 2004104036 A1 | 12/2004 |
| WO | 2006091076 A1 | 8/2006 |
| WO | 2007047350 A2 | 4/2007 |
| WO | 2009017840 A2 | 2/2009 |
| WO | 2010057372 A1 | 5/2010 |
| WO | 2014082007 A2 | 5/2014 |
| WO | 2014094412 A1 | 6/2014 |
| WO | 2017222360 A1 | 12/2017 |
| WO | 2018149773 A1 | 8/2018 |
| WO | 2019213461 A1 | 11/2019 |

OTHER PUBLICATIONS

English language abstract of foreign patent document JP4635520B2, downloaded Oct. 20, 2023, available online https://patents.google.com/patent/JP4635520B2/en?q=(soy+protein+fertilizer)&oq=soy+protein+fertilizer.

English language abstract of foreign patent document WO2004104036A1, downloaded Oct. 20, 2023, available online https://patents.google.com/patent/WO2004104036A1/en?oq=WO2004104036A1.

English language abstract of foreign patent document WO2010057372A1, downloaded Jan. 22, 2025, available online https://patents.google.com/patent/WO2010057372A1/en?oq=WO2010057372A1.

English language abstract of foreign patent document WO2014094412A1, downloaded Jan. 22, 2025, available online https://patents.google.com/patent/WO2014094412A1/en?oq=WO2014094412A1.

English language abstract of foreign patent document WO2017222360A1, downloaded Jan. 22, 2025, available online https://patents.google.com/patent/WO2017022260A1/en?oq=WO201722260A1.

English language abstract of foreign patent document CN107637593A, downloaded Apr. 15, 2025, available on-line https://patents.google.com/patent/CN107637593A/en?oq=CN107637593A.

International Search Report and Written Opinion from co-pending application PCT/US2024/061970, Forms PCT/ISA/220, PCT/ISA/210, PCT/ISA/237 (Apr. 15, 2025).

ORGANIC NITROGENOUS FERTILIZERS AND METHODS OF MAKING THE SAME

FIELD OF THE INVENTION

The present invention relates to fertilizers comprising organic materials, and more particularly to fertilizer compositions derived of a processed plant material with a high protein content comprising increased amino acid and oligopeptide concentrations and other beneficial compounds generated through a novel method of processing the plant material.

DISCUSSION OF THE BACKGROUND

Organic farming is a highly regulated segment of the agricultural industry. Government entities such as the US Department of Agriculture (USDA) and various state agencies have formulated strict rules (e.g., under the Organic Foods Production Act) governing the growing and handling techniques required for products labeled as "organic". These regulations are generally aimed at maintaining ecological and environmental conditions, and providing healthy foods. The demand for organic foods is rapidly increasing due to environmental stewardship concerns and consumer preference. Thus, many portions of the agricultural industry have become focused on organic alternatives to conventional methods of production, including using organic pesticides, herbicides, and fertilizers. Regulatory, environmental, and health concerns are primary reasons for using natural or organic products.

As such, there is a substantial potential market for fertilizers and other products that comply with the regulations for growing, harvesting or otherwise processing and/or obtaining organic food products. However, the existing chemical fertilizers are generally prohibited in organic farming, and composts and manures are commonly used as fertilizers. Composts and manures are often insufficient to generate desired crop yield, and thus supplemental macro nutrients are often needed in organic cropping systems. The industry has faced difficulties in finding economically efficient and effective organic chemical agents and natural materials. Thus, the agricultural industry faces significant challenges in productivity and efficiency in the area of organic farming.

There continues to be a particular need in organic farming for more effective fertilizers. Finding economical and efficient alternatives to existing fertilizers for use in organic farming has thus far been largely fruitless. Therefore, improved and efficient compositions of naturally produced nitrogenous compounds are needed.

SUMMARY OF THE INVENTION

The present invention provides organic fertilizer compositions and methods for making the same. The organic fertilizer composition of the present invention is rich in amino acids and oligopeptides, which are extracted from soy or other protein sources through a novel method. The amino acids and oligopeptides provide a nitrogen source that is environmentally friendly and that is compliant with organic farming regulations. Additional beneficial compounds are included in the composition produced by the presently disclosed method, including flavonoids, isoflavones, phytoalexins, phenols, phytosulfokines, and derivatives thereof.

In some embodiments, this invention provides a method for manufacturing a liquid nitrogen fertilizer from plant material, comprising one or more of the following steps: i) subjecting the organic material to a defatting process; ii) creating a slurry of the organic material; iii) performing an extraction process to dissolve and separate proteins, peptides, and other useful molecules from the plant material; iii) performing a heat hydrolysis step on the extracted liquid and/or the remaining solid material in water at a temperature in a predetermined range and pH in a pre-determined range for a predetermined period; iv) separating a liquid portion of the hydrolysate; v) performing an enzymatic digestion step on the liquid and/or solid portions of the hydrolysate using one or more proteases at a temperature in a predetermined range and pH in a pre-determined range for a predetermined period; vi) separating a liquid portion of the resulting digestate; vii) transferring the liquid portions of the enzymatic digestion step to a reaction tank for further enzymatic digestion; perform a denaturing step at high temperature to deactivate the enzymes; and viii) passing the combined liquid portions through an osmosis system to remove clean water and provide a concentrated hydrolysate extract that provides an amino acid rich fertilizer composition.

The plant material used in the manufacture of liquid nitrogen fertilizer may be from soybeans or soybean products. In some embodiments, the soy beans may be ground with water to break down the beans into a slurry. In some embodiments, the soy bean material may be discarded soy bean material (e.g., soybean meal) from a soy oil extraction process, such as from a soy milk processing plant. Other plant materials that may be utilized in the presently disclosed process include clover, duckweed, cottonseed, sunflower seed cake, mustard seed cake, lentils, chick peas, Spirulina, hemp seeds, chia seeds, alfalfa, and other high protein plant materials. Generally, these various plant materials may be processed to remove oil and other compounds prior to use in the method disclosed herein.

If the plant material is whole, unprocessed material (e.g., raw, unprocessed soy beans, hemp seeds, etc.), one or more of cracking, dehulling, and flaking processes may be applied to the plant material. For example, a whole soybean may go through a mechanical cracking process, followed by air separation to remove hulls under a temperature in a range of about 20° C. to about 40° C. (about 68° F. to about 104° F.). The resulting soy bean material may subsequently be rolled into flakes (e.g., have a size of about 0.25 to about 0.4 mm in thickness) under temperature conditions of about 70° C. to about 80° C. (about 158° F. to about 176° F.), which avoids oil oxidation. In other embodiments, the dehulled soy bean material may be ground to a pre-determined particle size in a range of about 0.1 to about 0.5 mm in diameter.

The processed plant material may be subjected to a defatting process to remove soybean oil from the processed plant material (e.g., cracked, dehulled soybean, or other processed plant material). The defatting process may involve adding a solvent (e.g., hexane) in an extraction unit, circulating the solvent at a temperature around 50° C. to about 70° C. (about 122° F. to about 158° F.) for a period of about 30 minutes to about 5 hours depending on the equipment and solvent circulation rate. The plant material may then be desolvated by heating (e.g., under a vacuum) to remove the solvent at a temperature typically about 100° C. to about 110° C. (about 212° F. to about 230° F.) for a time period in a range of about 30 minutes to about 2 hours, depending on the equipment. The use of defatted plant material improves the efficiency hydrolysis process as fats and oils can hinder the hydrolysis of proteins. Water may be the medium for hydrolysis, facilitating the breakdown of chemical bonds in the proteins in the plant material.

Once the defatted plant material has been prepared, it may be processed through a series of hydrolysis steps and filtrations to produce a nitrogen-rich liquid fertilizer composition. The method of the present invention includes one or more extraction and hydrolysis steps using heat and an enzymatic hydrolysis step. There may also be multiple separation and filtration steps in the method.

In some implementations, a first extraction step may be conducted to produce first extraction product in a reaction chamber, such as a jacketed reactor vessel, stirred tank reactor, or a bioreactor operable to control the pH, temperature, and pressure conditions within the chamber. One or more alkaline agents, such as calcium hydroxide, may be used raises the pH to a basic range, e.g., a pH from about 8 (e.g., about pH 7.8 to about pH 8.2, or any range of values therein). A mild alkaline environment also avoids excessive denaturation or degradation proteins and peptides. The specific pH range improves the solublization of the proteins and amino acids through avoidance of the iso-electric point of soy protein which is a pH between 4.5 and 5.5. The extraction process may be conducted at a temperature range of about 27° C. to 32° C. (about 80° F. to 90° F.), which provides sufficient thermal energy to facilitate the extraction of the proteins provided a sufficient amount of time while avoiding denaturation of temperature-sensitive protein compounds. The duration of the extraction step may be conducted over the course of about 6 hours to about 12 hours to allow for thorough breakdown of the proteins in the plant material at the applied pH and temperature, without excessively prolonged exposure that may lead to unwanted side reactions or degradation of the desired end products. Monitoring and control of the pH and temperature results in consistent level of solubility. The first extraction step may sufficient to dissolve proteins and peptides in the aqueous liquid portion.

In some implementations, the resulting first extraction product may be mechanically separated into solid and liquid portions. In some implementations, the mixture may be placed in a screw press, decanter centrifuge, disk-stack centrifuge, or other appropriate solid-liquid separation apparatus. The mixture may be transferred to separator apparatus, which applies force to the mixture to separate solid from liquid fractions. In some embodiments, the mixture may be diluted in water at a concentration of about 25% to about 45% w/w. The pH of the mixture may be adjusted to a range of about 6 to about 9 prior to the separation process. The force causes denser solid particles to move outward to the periphery of the equipment, while the less dense liquid phase forms an inner layer. The apparatus then separates and collects the solid and liquid fractions. The separation process may be continuous, with solids and liquids being continuously discharged from different parts of the equipment. The resulting solid fraction may be composed of undissolved plant fibers, residual plant material, and larger, undissolved proteins and polypeptides. The resulting liquid fraction contains water, dissolved proteins and polypeptides, alkaline agents (e.g., potassium hydroxide), and other soluble components from the plant material. In some implementations, the liquid fraction from the separation process may be collected from the separation apparatus for a hydrolysis process and the solid fraction may be collected for filtering an optional hydrolysis process.

In some embodiments, the method for separating solid and liquid portions of the first extraction mixture may utilize a mechanical separation equipment, such as a screw press or similar mechanical separators. Such mechanical separators efficiently isolate a liquid fraction containing dissolved proteins, peptides, amino acids, and other soluble components from a solid fraction composed of undissolved plant fibers, residual proteins, and other insoluble materials. The first extraction mixture may be transferred to a screw press for separation. The screw press includes a screw conveyor housed within a perforated or slotted cylindrical chamber. A motorized drive system rotates the screw, applying increasing mechanical pressure to the mixture as it moves through the length of the chamber. The mixture is introduced through a feed inlet, and as it advances along the screw axis, the pressure forces the liquid portion to exit through the perforations in the chamber walls, where it is collected in a reservoir positioned beneath the chamber. This liquid fraction, rich in dissolved nitrogenous compounds, can be directed to subsequent enzymatic hydrolysis or filtration steps for further processing.

Simultaneously, the screw press compacts the remaining solid portion, which exits the press through a discharge port at the end of the chamber. This solid fraction contains undissolved plant fibers, larger polypeptides, and residual proteins. The solid material can optionally undergo additional processing steps, such as further enzymatic hydrolysis, filtration, or drying, to recover additional soluble components or convert the residual material into a secondary product, such as a pelletized organic fertilizer.

In some embodiments, to maximize the recovery of nitrogenous compounds, the solid fraction from the first separation step is reintroduced into the mechanical separation apparatus or an equivalent system for further processing. During this second separation step, additional liquid containing dissolved proteins and peptides is extracted from the solid material. In some embodiments, the resulting solids from the first separation step may be mixed with water at a ratio of about 25% to about 60% w/w solid fraction from the first separation step with about 40% to about 75% water w/w. This iterative process may be repeated a plurality of times, with the solid fraction undergoing mechanical separation two or more times, depending on the plant material and desired extraction efficiency. The resulting liquid fractions from the multiple separation steps can be combined and directed to subsequent processing stages, such as enzymatic hydrolysis, filtration, or concentration, to produce a nitrogen-rich fertilizer composition.

The repeated application of mechanical pressure results in residual liquid trapped within the solid matrix being released, significantly increasing the overall yield of the protein-rich extract. Performing multiple rounds of separation on the solid fraction provides several advantages. It maximizes the recovery of soluble proteins, peptides, and amino acids, ensuring a higher efficiency in nitrogen extraction. This approach also minimizes waste by reducing the amount of nitrogenous material retained in the solid fraction. The liquid portion(s) recovered from the one or more separation processes may be combined and advanced through the hydrolysis process. In some implementations, the liquid portions one or more separation processes may be separately advanced through the hydrolysis process.

The liquid portions collected from the one or more separation processes may have about 10% to about 30% solids w/w, including proteins and polypeptides, simple sugars (mono- and disaccharides) and some oligosaccharides having a molecular weight in a range of about 150 D to about 3 kD, isoflavones (e.g., genistein, daidzein, glycitein, genistin, and malonylglycosides), flavonoids (e.g., quercetin, kaempferol, catechins, and epicatechins), phenolic compounds (e.g., caffeic acid, ferulic acid, coumaric acid, and Gallic acid), saponins (e.g., soyasaponins and diosgenin-derived saponins), polysulfides (e.g., methionine sulfoxide, allium polysulfides, glucosinolate-derived polysulfides, and phytosulfokines), and phytosulfokines (e.g., phytosulfokine-α). The viscosity of the liquid portion(s) may be in a range of about 10 cP to about 200 cP at room temperature.

The remaining solid material, after multiple rounds of separation, can optionally undergo further hydrolysis or be processed into secondary products. The solid portion is rich in carbohydrates (particularly polysaccharides and oligosaccharides such as cellulose, hemi-cellulose, pectins, bound oligosaccharides, and other generally having molecular weights in a range of about 1 kD to about 300 kD or greater), fibers, and residual proteins, is repurposed as a versatile material suitable for various applications, such as pelletized fertilizers, soil amendments, animal feed, and other bio-based products. The solid portion may be composed of plant fibers, polysaccharides, oligosaccharides, and residual peptides that remain after mechanical separation processes, such as screw press filtration, following extraction and hydrolysis steps. This material retains significant nutritional and functional value, making it suitable for use in animal feed formulations. The fiber content contributes to digestive health in livestock, while residual proteins and peptides provide essential nutrients. Additionally, the material can be fortified with amino acids or minerals to enhance its nutritional profile.

In agricultural applications, the solid portion serves as a valuable soil amendment. The fibrous composition improves soil structure, enhances water retention, and promotes the growth of beneficial microorganisms. The residual nitrogenous compounds can act as a slow-release nutrient source, enriching the soil and supporting sustainable farming practices. Furthermore, the solid material can be processed into bio-based products, such as biodegradable mulch films, compostable packaging, or renewable energy sources through anaerobic digestion or biochar production. It may also serve as a substrate for growing mushrooms or other fungi due to its high cellulose content.

By repurposing the solid portion into valuable products, the present invention promotes resource efficiency and sustainability, ensuring that byproducts of the fertilizer production process are utilized. This approach not only reduces waste but also creates additional value streams in agriculture, animal husbandry, and bio-industrial applications.

For the liquid portion(s) yielded from the separation process, a hydrolysis step for the separated liquid fraction may be conducted with the addition of water and protease enzymes. The liquid fraction may be added to a reaction chamber, such as a jacketed reactor vessel, stirred tank reactor, or a bioreactor. The proteins and peptides (e.g., in the case of soy, β-conglycinin, glycinin, lectins, and others) in the liquid fraction may be hydrolyzed by the added protease enzymes, which hydrolyze peptide bonds in the proteins and peptides to yield free amino acids and smaller oligopeptides. One or more proteases are added at concentrations in a range of about 50 to 1,000 activity units per liter (U/L) of the reaction mixture. The concentration may be adjusted based on the specific activity of the enzyme used and the target degree of hydrolysis. For example, one or more of the following protease concentrations may be used to hydrolyze the liquid fraction: bromelain at 100-500 U/L, papain at 200-1,000 U/L, thermolysin at 50-300 U/L. The enzymes may be derived from bacterial, fungal, or plant-based sources, chosen to optimize hydrolysis under the reaction conditions.

One or more alkaline agents, such as calcium hydroxide or natural ammonia, may be used to raise or maintain the pH to a basic range, e.g., a pH from about 8 to about 9, which is conducive for the activity of many proteases and can help in maintaining the stability of the enzymes while enhancing their catalytic efficiency. A mildly alkaline environment can enhance and accelerate the hydrolysis the breakdown of certain molecular bonds, particularly peptide bonds in proteins. The reaction chamber includes agitator to keep the enzymes and protein substrate homogenously distributed in the chamber to allow efficient enzyme activity. The hydrolysis process may be conducted at a temperature range of about 48° C. to about 60° C. (about 120° F. to 140° F.), which accelerates enzymatic activity but does not result in denaturation of the protease enzymes. The proteases utilized in the presently disclosed methods may be bacterial proteases, such as thermophilic bacterial proteases having higher temperature resistances. In some implementations, the enzyme digestion may be performed with one or more of bromelain, papain, papain-like proteases, subtilisin, trypsin, thermolysin, protease K, renin, leucine amino peptidase, and combinations thereof. The temperature range optimizes the activity of many proteases. The reaction may be conducted for a period of about 2 hours to about 4 hours, which is sufficient for substantial enzymatic hydrolysis of proteins. The enzymatic digestion process reduces proteins to oligopeptides and amino acids at water soluble pH (e.g., above isoelectric point of pH 4.5). The enzymatic digestion results in a first hydrolysate that may peptides of a reduced size in a range of about 500 Daltons to about 1000 Daltons. In the resulting hydrolysate, about 80% or less, about 75% or less, about 70% or less, of the total peptides may have a size of less than 2000 Daltons.

In some embodiments, the solid fraction may be added to the reaction chamber or may be placed in a second reaction chamber under the same conditions. In such embodiments, the remaining proteins and peptides in the solid material may be hydrolyzed as well. A resulting hydrolysate mixture may be mechanically separated into solid and liquid portions in a second separation process. In such implementations, the resulting hydrolysate mixture may be transferred to separator apparatus, which applies centrifugal force to the mixture (e.g., a decanter centrifuge, disk-stack centrifuge, or other appropriate solid-liquid separation apparatus). The apparatus may then separate and collect the solid and liquid fractions from the enzyme digestion. The second liquid fraction may contain amino acids and oligopeptides produced from the enzymatic digestion, providing additional nitrogenous compounds for the fertilizer composition, with water, alkaline agents (e.g., calcium hydroxide), and other soluble components from the plant material. A substantial proportion of the protein content of the solid fraction may be broken down into amino acids and oligopeptides at this stage. In some implementations, the second liquid fraction from the separation process may be collected from the separation apparatus for later filtering and the second solid fraction may be collected for a further processing.

A filtering process may be applied to the solid fraction (e.g., either an unhydrolyzed solid material from the extraction step or a hydrolyzed solid material from the hydrolysis step) to extract any remaining liquid containing proteins, polypeptides, oligopeptides and free amino acids. The process involves placing the solid fraction into a filter system for extracting the remaining liquid portion. The filter system may be a filter press. The second solid fraction may be loaded into the press, where it is subjected to high pressure, forcing the remaining liquid to permeate through the filter material (e.g., cloth), leaving the solid material behind. The pressure applied can be adjusted according to the nature of the plant material to optimize the extraction process. Alternatively, a rotary drum filter may be used to filter the second solid portion, which involves a rotating cylindrical drum covered with a filter cloth or mesh. Additionally, a vacuum filtration technique can be considered, where a vacuum is applied beneath a filter medium to enhance the separation of the liquid from the solids. This method is beneficial for extracting finer particles and provides a more thorough separation, ensuring a higher purity of the liquid extract.

In some implementations, the liquid portions from the hydrolysis may be combined to yield a combined liquid hydrolysate. The combined hydrolysate may then be passed through a steam heater, which can serve to further concentrate the extract by reducing its water content. The combined liquid hydrolysate may optionally undergo further treatment to enhance its composition and effectiveness as a fertilizer. The combined extracts may be placed in a third reaction chamber and exposed to a pre-determined temperature in a range of about 48° C. to about 60° C. (120° F. to about 140° F.) for about 60 to about 120 minutes to allow for the protease enzymes to continue hydrolyzing the peptides therein and other enzyme sensitive nitrogen materials. The conditions in the third chamber may subsequently be modified to denature the protease enzymes. The combined hydrolysates are heated to a temperature range of about 75° C. to about 90° C. (about 170° F. to about 190° F.). The process is conducted at a controlled pH of about 8, which is maintained to ensure an optimal environment for further hydrolysis of peptide bonds to occur without compromising the amino acid chemistry of the liquid extract. The duration of this heating step is approximately 2 hours, a carefully determined period that is long enough to deactivate substantially all of the protease enzymes present in the chamber. This step may further refine the combined liquid extract into a liquid fertilizer with more free amino acids through temperature-based hydrolysis.

In some implementations, the combined liquid extracts may be processed through a dewatering process, which removes excess water from the hydrolysate liquid. The dewatering process may be vacuum-assisted evaporation, forward osmosis, reverse osmosis process, and/or other drying processes. In the case of a reverse osmosis system, pressure is applied to the liquid extracts against a semi-permeable membrane, selectively allowing water molecules to pass through while retaining larger molecular compounds, such as amino acids and oligopeptides, in the concentrated liquid. The pressure applied is calibrated to optimize the separation process, ensuring efficient removal of clean water while concentrating the nitrogenous compounds. The reverse osmosis process is conducted at controlled temperatures and pressures, typically ranging from about 20° C. to about 30° C. (about 68° F. to about 86° F.) and 200 to 400 psi, to maintain the stability of the amino acids and prevent denaturation or degradation of the compounds. The pH of the liquid extracts may be varied from slightly acidic (about pH 6 to about pH 6.8) or slightly basic (about pH 7.3 to about pH 8.5) depending on the desire to remove any specific pH sensitive volatile compounds such as carbon dioxide or ammonia. The result of this step is a concentrated liquid hydrolysate rich in amino acids, which forms the base of the nitrogen-rich fertilizer composition. This concentration process enhances the nutrient density of the fertilizer and reduces the volume for more efficient storage and transportation. The concentrated liquid hydrolysate emerging from this process represents a high-value, environmentally sustainable fertilizer product, suitable for various agricultural applications. The nitrogen-rich, filtered hydrolysate having a nitrogen content by weight of about 2% to about 12% with about 40% to about 50% water w/w.

In some implementations, a drying process may be applied to the solid plant material remaining after the filtration process (e.g., press filtration). This drying step may be conducted using a flash drying system, which is particularly effective for rapidly reducing moisture content while preserving the integrity of the plant material. In this system, the solid material is exposed to a high-velocity hot gas stream, typically at temperatures ranging from about 150° C. to about 200° C. (about 302° F. to about 392° F.). This rapid drying method is efficient in removing moisture without significantly degrading the nutritional and chemical properties of the plant material. Once dried, the solid material may include about 5% to about 15% water w/w.

After the drying process, the dried solid material may be transferred to a pellet mill. In the pellet mill, the dried plant material may be compressed into small, dense pellets. This pelletizing process may involve the application of pressure and heat, typically in the range of about 70° C. to 90° C. (about 158° F. to 194° F.), to facilitate the binding of the particles. The size and shape of the pellets can be adjusted based on the specifications of the pellet mill and the desired end-use of the fertilizer. The resulting pellet fertilizer is characterized by its ease of handling, storage, and application, making it a practical and efficient option for agricultural use. The utilization of the by-products of the liquid fertilizer production provides sustainable agricultural practices.

According to one implementation, the method may include for producing a liquid organic fertilizer including the following steps:

a. Performing an extraction step on defatted plant material in water and an alkaline agent (e.g., calcium hydroxide, natural ammonium hydroxide, or other basic agents that do not affect the chemical groups of the proteins and polypeptides) at a pH in a range of 8 to 9 and a temperature of in a range of about 27° C. to about 32° C. (about 80° F. to 90° F.) for a period of about 2 hours to about 12 hours in a first chamber;

b. One or more separating steps applied to the resulting mixture of Step a to remove one or more first liquid portions by filtering (e.g., by screw press, centrifugation, or other method), and leaving the soybean meal solids;

c. Adding protease enzymes to the one or more first liquid portions in a second chamber and performing an enzyme hydrolysis step at a pH in a range of 8 to 9 and a temperature of in a range of about 48° C. to about 60° C. (120° F. to about 140° F.) for a period of about 2 hours to about 4 hours;

d. Optionally adding water to the soy bean meal solids of Step b and performing a hydrolysis step on the solids using protease enzymes at a pH in a range of 8 to 9 and a temperature of in a range of about 48° C. to about 60° C. (120° F. to about 140° F.) for a period of about 2 hours to about 4 hours;

e. Separating the resulting mixture of Step d to remove a second liquid portion by filtration or other separation step (e.g., by centrifugation), and leaving the plant material solids;

f. Placing the plant material solids of Step e in a filter system (e.g., a filter press) and filtering the plant materials to extract the remaining liquid portion of the plant material to yield a third liquid portion;

g. Combining the liquid portions of Steps c and e (and optionally Step f) and optionally passing the combined extract to a steam heater and/or placing the combined extracts in a third chamber, where the combined liquid portions are kept at a temperature of 48° C. to about 60° C. (120° F. to about 140° F.) for 60 to 120 minutes to allow for the enzymes added in Step c to continue hydrolyzing peptides and other enzyme sensitive nitrogen materials;

h. Heating the composition of Step g at a pH of about 8 and a temperature of in a range of about 75° C. to about 90° C. (about 170° F. to about 190° F.) for a period of about 2 hours to denature and deactivate the enzymes to prevent any further degradation;

i. Passing the combined liquid extracts of Step h through filtration device (e.g., a forward or reverse osmosis system) to remove clean water and provide a concentrated liquid hydrolysate that provides an amino acid rich fertilizer composition; and j. Drying the filtered solid plant material of Step f (e.g., using a flash drying system) and placing the dried solid plant material into a pellet mill to produce a separate pellet fertilizer.

The method of the present invention provides a liquid organic fertilizer for organic agriculture obtained by extracting nitrogenous compounds from proteinaceous organic materials. The fertilizer composition may include the organically derived nitrogenous compounds at a concentration in a range of about 2% to 12% by weight. Nitrogen in the fertilizer composition may be comprised in amino acids, oligopeptides, and/or other nitrogenous compounds, where the oligopeptides having sizes in a range of about 500 Daltons to about 1000 Daltons, wherein at least 80% of the peptides in the composition are less than about 2000 Dal.

The nitrogen-rich fertilizer composition produced by this process is an organic amino acid and peptide solution that is usable in organic farming. The nitrogenous compounds at a concentration in a range of about 2% to 12% by weight. The organic nitrogen-rich composition may be used to create fertilizer compositions that are compliant with the Organic Foods Production Act of 1990, USDA Organic Regulations, (generally referred to as the National Organic Program or NOP) and other agency standards for use in organic farming and can be used in organic farming operations. In some embodiments, the fertilizer composition may be mixed with other plant and soil nutrient compounds that are compatible with organic farming to create a nitrogen-rich organic fertilizer composition.

In some embodiments, and without limitation, a fertilizer composition may include a liquid composition that includes about 2% to about 12% free amino acids and oligopeptides w/w (e.g., 4% w/w to about 10% w/w, or any value or range of values therein), and/or one or more additional ingredients. In some embodiments, the organic fertilizers may include one or more additional compounds that enhance plant growth. These additional organic compounds may include one or more of isoflavones, phytoalexins, phenols, phytosulfokines, and derivatives thereof (e.g., alkali salts, etc.). In some implementations, the composition may include isoflavones in a concentration range of about 0.01% w/w to about 0.2% w/w (e.g., about 0.05% w/w to about 0.15% w/w, or any value or range of value therein). In some implementations, the composition may include phytoalexins in a concentration range of about 0.0001% w/w to about 0.002% w/w (e.g., about 0.0005% w/w to about 0.0015% w/w, or any value or range of value therein). In some implementations, the composition may include phenols in a concentration range of about 0.001% w/w to about 0.02% w/w (e.g., about 0.005% w/w to about 0.015% w/w, or any value or range of value therein). In some implementations, the composition may include phytosulfokines in a concentration range of about 0.0001% w/w to about 0.002% w/w (e.g., about 0.0005% w/w to about 0.0015% w/w, or any value or range of value therein).

The inclusion of isoflavones, phenols, and phytoalexins in the nitrogenous liquid fertilizer may provide synergistic benefits for plant health and growth. Isoflavones act as natural growth promoters and enhance nitrogen uptake efficiency. Phenols offer antioxidant properties, reducing oxidative stress and supporting root and shoot development. Phytoalexins, as plant-derived antimicrobial compounds, boost natural defense mechanisms, improving resistance to pathogens. Together, these compounds create a bioactive environment that not only enhances nutrient absorption but also promotes plant vigor and resilience against environmental stresses. This synergy maximizes crop productivity while fostering sustainable agricultural practices by reducing dependency on synthetic additives.

The fertilizers may further include organic acids (e.g., citric acid, acetic acid, lactic acid, or other weak organic acid useful for stabilizing pH) that may serve to balance the pH of the concentrated amino acids in the fertilizer. The pH may be maintained in a range around neutral pH, such as between about pH 6 and pH 8 (e.g., from about pH 6.5 to about pH 7.5). To balance the pH of the liquid fertilizer, the liquid fertilizer may include one or more organic acids.

The nitrogenous liquid fertilizer derived from the disclosed methods can be tailored for diverse agricultural applications, including foliar sprays, fertigation, drip irrigation, transplant and drip/drench treatments, and starter fertilization at germination. The versatility of the fertilizer stems from its high nitrogen content, solubility, and compatibility with organic farming practices, making it suitable for various crops and growth stages.

To prepare a fertilizer for foliar spray application, the concentrated nitrogenous liquid fertilizer may be diluted with water to achieve a nitrogen concentration optimized for foliar uptake, typically around 0.5% to 1% nitrogen by weight. This ensures efficient absorption without causing leaf burn. The diluted solution may be mixed with other micronutrients or plant growth regulators, depending on the specific crop requirements. The foliar spray is applied using conventional sprayers, ensuring even coverage of the leaves for effective nutrient absorption through the stomata and epidermis. Foliar applications are particularly useful for addressing nitrogen deficiencies during critical growth stages, such as flowering or fruiting.

For fertigation, the nitrogenous liquid fertilizer is prepared by diluting the concentrated hydrolysate to achieve a nitrogen concentration suitable for incorporation into the irrigation system, typically 0.1% to 0.5% nitrogen by weight. The liquid fertilizer is compatible with most fertigation systems, including pivot, sprinkler, and flood irrigation. The prepared solution is introduced into the irrigation water at a controlled rate using injection pumps or proportional mixing systems. This method ensures uniform delivery of nutrients to the root zone while optimizing water use efficiency. The fertilizer's high solubility prevents clogging of irrigation equipment and allows seamless integration into fertigation schedules.

The nitrogenous liquid fertilizer can also be used in drip irrigation. The nitrogenous liquid fertilizer may be diluted to concentrations similar to those for fertigation, typically 0.1% to 0.3% nitrogen by weight. The diluted fertilizer is injected into the drip system using dosing pumps or venturi injectors, ensuring a consistent supply of nutrients directly to the root zone. The liquid fertilizer's low molecular weight and water solubility make it ideal for drip irrigation, minimizing the risk of clogging emitters. This application method is particularly beneficial for high-value crops like vegetables, fruits, and flowers, where precise nutrient delivery is critical.

For transplant applications, the nitrogenous liquid fertilizer may be diluted to a concentration of 0.2% to 0.5% nitrogen by weight. The diluted solution is applied as a root drench at the time of transplanting to promote early root establishment and minimize transplant shock. Similarly, for drip or drench methods, the solution is prepared by mixing the fertilizer with water to achieve the desired concentration and applied directly to the soil surrounding the plant base. This method provides localized nutrient delivery, making it ideal for row crops and newly planted orchards.

The nitrogenous liquid fertilizer can also be used as a starter fertilizer, the nitrogenous liquid is diluted to a low concentration, typically around 0.1% to 0.2% nitrogen by weight, to avoid seed damage or over-fertilization. The diluted solution may be applied either directly to the seedbed or mixed into the soil at the time of planting. The amino acid and peptide content may enhance early germination and root development, providing an initial nitrogen boost critical for establishing seedlings.

The nitrogenous liquid fertilizer produced by the disclosed method can also be adapted for use in dry fertilizer applications. The liquid hydrolysate may undergo a drying process, such as spray drying, vacuum drying, or drum drying, under controlled conditions to preserve the integrity of heat-sensitive amino acids and peptides to provide a powdered nitrogen-rich fertilizer. In some implementations, the combined liquid hydrolysate may be passed through an evaporator to yield a further concentrated, filtered liquid extract rich in nitrogenous compounds (e.g., amino acids and oligopeptides). The evaporator may be a rotary evaporator, a falling film evaporator, or vacuum evaporator suitable for heat-sensitive liquids like those that include amino acids and oligopeptides. The evaporator may apply heat to the filtered liquid extract under controlled temperature (e.g., in a range of about 40° C. to about 60° C.) and pressure conditions (e.g., about 0.02 atm to about 0.1 atm) operable to vaporize water and other volatile components in the hydrolysate while preventing the degradation of heat-sensitive compounds like amino acids, leaving behind a more concentrated solution of nitrogenous compounds.

The concentrated, filtered liquid extract may then be passed through a dryer to yield a dry powder comprising the nitrogenous compounds. The dyer may be a vacuum dryer, spray dryer, or drum dryer suitable for heat-sensitive liquids like those that include amino acids and oligopeptides. The drying process may be conducted until the desired moisture content is achieved, ensuring the stability and storability of the final fertilizer product. The temperature is to be high enough to facilitate rapid drying but not so high as to degrade the nitrogenous compounds. In the case of vacuum drying, the temperature may be in a range of about 40° C. to about 60° C. at a pressure in a range of about 0.05 atm to about 0.2 atm. In the case of spray drying, the temperature may be in a range of about 80° C. to about 110° C. In the case of drum drying, the temperature may be in a range of about 80° C. to about 100° C.

The resulting dried composition may include about 10% to about 50% w/w or more by weight free amino acids and oligopeptides, and/or one or more additional ingredients, such as isoflavones, phytoalexins, phenols, phytosulfokines, and derivatives thereof (e.g., alkali salts, etc.). The dried composition may include about 5% to about 15% water w/w. For application as a dry fertilizer, the powder may be blended with other nutrient-rich materials, such as organic macronutrients (e.g., gypsum or dolomitic lime), micronutrients, and a calcium sulfate source to create balanced fertilizer formulations tailored to specific crop needs. An organic fertilizer composition of the present invention may also include additional components routinely used in the art, for example, humectants, adjuvants, antioxidants, stabilizers, and combinations thereof. The dry fertilizer is easy to store, transport, and apply, providing sustained nitrogen release and promoting soil health. This versatility enables farmers to integrate the nitrogenous fertilizer into both conventional and organic farming practices, enhancing crop yield and environmental sustainability.

It is an objective of the present invention to provide improved organic fertilizers that include an organic nitrogen source that complies with regulatory agencies, such as the FDA and NOP.

It is a further objective of the present invention to provide improved methods for producing concentrated amino acids and oligopeptides from a natural source through hydrolysis processes.

It is a further objective of the present invention to provide improved organic fertilizer compositions having a high concentration of organically derived nitrogen.

Additional aspects and objects of the invention will be apparent from the detailed descriptions and the claims herein.

DETAILED DESCRIPTION OF THE EXEMPLARY EMBODIMENTS

Reference will now be made in detail to certain embodiments of the invention, examples of which are illustrated in the accompanying drawings. While the invention will be described in reference to these embodiments, it will be understood that they are not intended to limit the invention. Conversely, the invention is intended to cover alternatives, modifications, and equivalents that are included within the scope of the invention as defined by the claims. In the following disclosure, specific details are given as a way to provide a thorough understanding of the invention. However, it will be apparent to one skilled in the art that the present invention may be practiced without these specific details.

Figure 1:
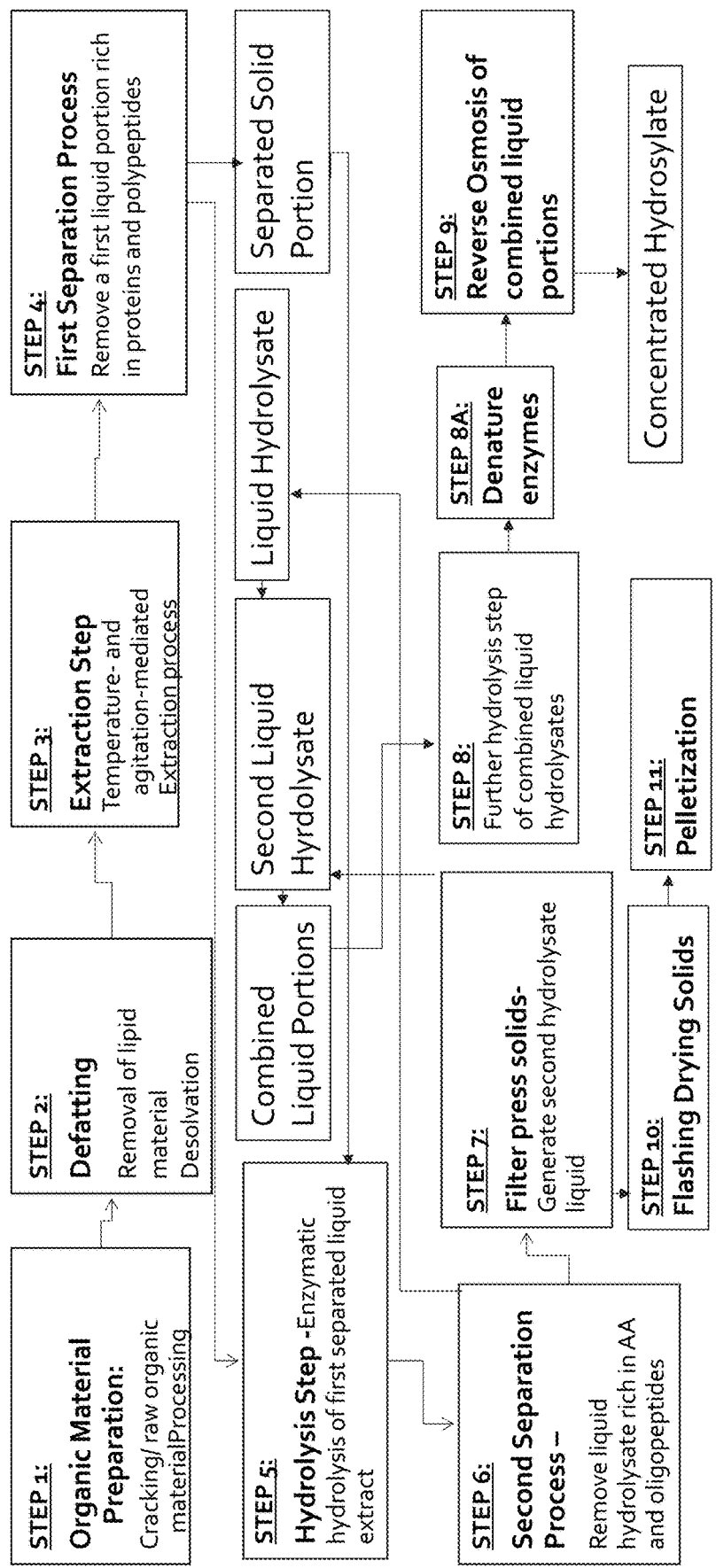
FIG. 1 shows a flow chart of a process for producing a nitrogen-rich fertilizer composition from a protein-rich plant material according to the present invention.
Figure 2:
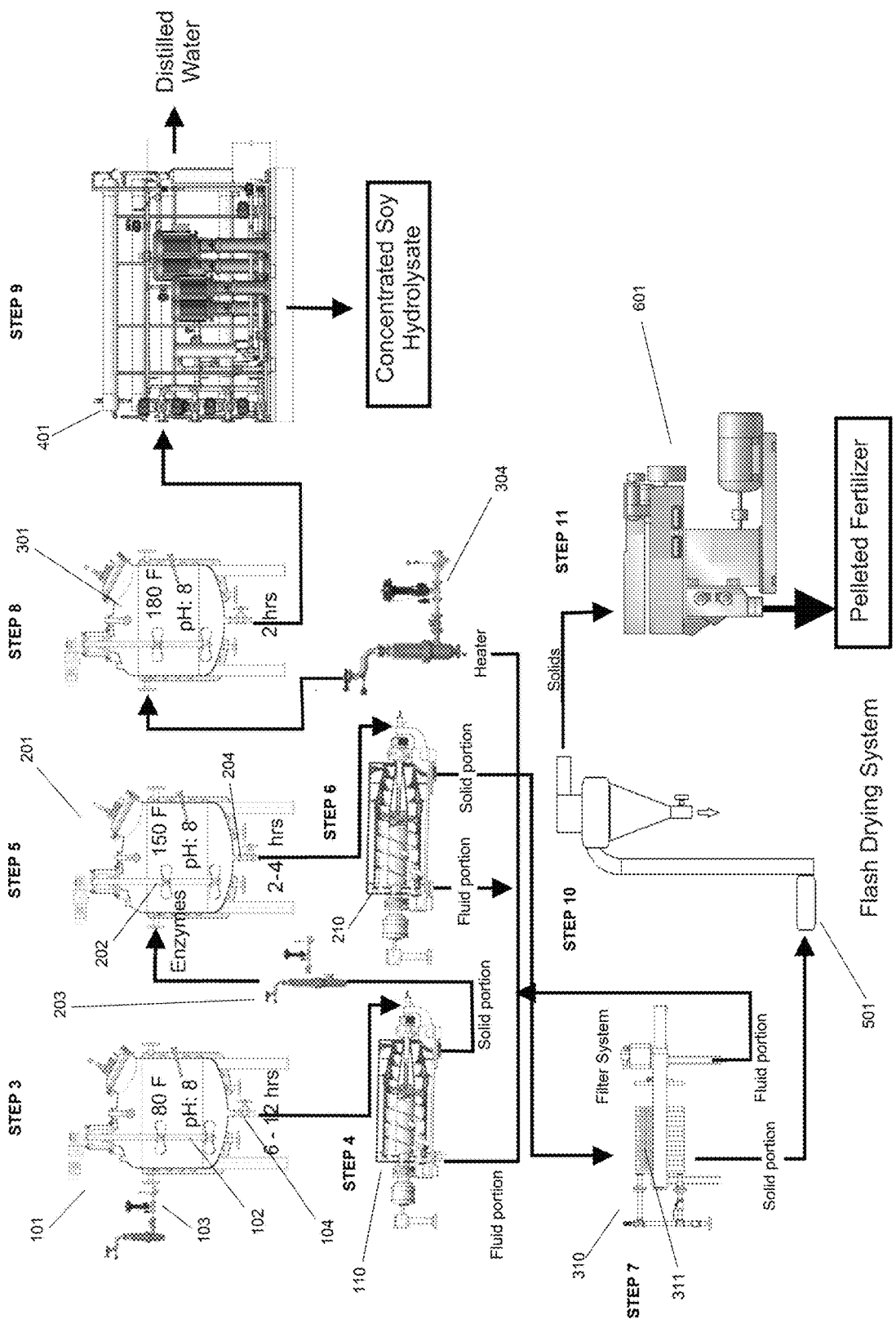
FIG. 2 shows a process for producing a nitrogen-rich fertilizer composition from a protein-rich plant material according to the present invention.

Referring to the drawings, wherein like reference characters designate like or corresponding parts throughout the several views, and referring particularly to FIGS. 1-2, it is seen that the present invention includes various embodiments of organic fertilizers containing organically produced nitrogen-rich fertilizer material, and methods of production of such fertilizers.

Methods of Producing Organic Fertilizer Compositions

The present invention may include a process for extracting a nitrogen rich liquid composition from an organic material source, such as soy beans or other protein-rich plant material. FIG. 1 provides a generalized flowchart of the plant material processing steps. FIG. 2 provides a schematic diagram of the process.

As shown in FIG. 1, the plant material may be whole, unprocessed plant material (e.g., unprocessed soybeans, etc.), and a mechanical process of cracking, dehulling, and flaking may be first applied to the plant material in Step 1. The mechanical processing step may be followed by air separation to remove hulls under a temperature in a range of about 20° C. to about 40° C. (about 68° F. to about 104° F.). The resulting plant material may subsequently be rolled into flakes (e.g., have a size of about 0.25 to about 0.4 mm in thickness) under temperature conditions of about 70° C. to about 80° C. (about 158° F. to about 176° F.), which avoids oil oxidation.

The processed plant material may be subjected to a defatting process to remove soybean oil from the processed plant material (e.g., processed soy bean, discarded soy bean, etc.) in Step 2. The defatting process may involve adding a solvent (e.g., hexane) in an extraction unit, circulating the solvent at a temperature around 50° C. to about 70° C. (about 122° F. to about 158° F.) for a period of about 30 minutes to about 5 hours depending on the equipment and solvent circulation rate. The plant material may then be desolvated by heating (e.g., under a vacuum) to remove the solvent at a temperature in a range of about 100° C. to about 110° C. (about 212° F. to about 230° F.) for a time period in a range of about 30 minutes to about 2 hours, depending on the equipment.

Once the plant material has been mechanically prepared and defatted, it may be processed through a series of extraction, hydrolysis, and filtration steps to produce a nitrogen-rich liquid fertilizer composition. The method of the present invention includes one or more hydrolysis steps using heat and an enzymatic hydrolysis step. There may also be multiple separation and filtration steps in the method. In an extraction step (Step 3), the plant material may be introduced into a first reaction chamber 101, which may be a stirred tank reactor or other appropriate chamber (e.g., jacketed reactor vessel, a bioreactor, etc.). The chamber 101 may have an agitation mechanism 102 for mixing the organic material in the solution in the chamber into a substantially uniform, but heterogeneous mixture to avoid stratification of the mixture. For example, the chamber 101 may include a central vertical agitator 102, but other agitation mechanisms may be used (e.g., a stirring rod, water injectors, recirculation pumps, or other agitation mechanism).

The solution in the chamber 101 may be an alkaline solution of calcium hydroxide, ammonium hydroxide, or other alkaline agent (NaOH, NH$_4$OH, KOH, etc.). The alkaline solution may have a pH in a range of about 7.8 to about 8.2. The temperature of the solution in the chamber 101 may be maintained in a range of about 27° C. to 32° C. (about 80° F. to 90° F.), which provides sufficient thermal energy to facilitate the hydrolysis of the proteins. The chamber 101 may include a heating element 103, which may be a steam heater or other heating element, such as a heating coil, a heating jacket, or other heating mechanism. The extraction step may be conducted over the course of about 6 hours to about 12 hours to allow for thorough extraction of the proteins and polypeptides in the plant material at the applied pH and temperature. The processed plant material may be added directly to the alkaline solution in the chamber 101 and agitated periodically or continuously.

After the plant material has been sufficiently mixed with the alkaline solution under the foregoing thermal conditions, a significant proportion of the proteins and polypeptides in the plant material are extracted into solution (e.g., greater than at least about 50% w/w, greater than at least about 60% w/w, greater than at least about 70% w/w), the mixture may be transferred through a valve and conduit assembly 104 to a separation apparatus 110 for separation into liquid and solid portions. The first separation process (Step 4) may be conducted during which the extract mixture of Step 3 may be mechanically separated by separation apparatus 110. The separation apparatus 110 may be a centrifuge, such as a decanter centrifuge or other centrifugation or separation apparatus (e.g., a disk-stack centrifuge, screw press, rotary drum filter, microfiltration system, or other appropriate solid-liquid separation apparatus). The solid fraction may be composed of undissolved plant fibers, residual plant material, and larger, undissolved proteins and peptides. The liquid fraction contains water, dissolved proteins and polypeptides, alkaline agents (e.g., calcium hydroxide), and other soluble components from the plant material, which may include isoflavonoids, isoflavones, phytoalexins, phenols, phytosulfokines, carbohydrates, and other compounds. The liquid fraction from the separation process may be collected from the separation apparatus for later hydrolysis and the solid fraction may be collected for filtration and optionally a further hydrolysis process.

In a first hydrolysis step (Step 5), the liquid portion of the hydrolysis product of Step 3 may be introduced into a second reaction chamber 201, which may be a stirred tank reactor or other appropriate chamber. The chamber 201 may have an agitation mechanism 202. The solution in the chamber 201 may be an alkaline solution of calcium hydroxide or other alkaline agent (NaOH, KOH, etc.). The alkaline solution may have a pH in a range of about 8 to about 9, which is conducive for the activity of many proteases and can help in maintaining the stability of the enzymes while enhancing their catalytic efficiency. The first hydrolysis Step 5 may treat the liquid extract portion with protease enzymes under elevated temperature. The proteins and peptides in the extract liquid may be hydrolyzed by the added protease enzymes, which hydrolyze peptide bonds in the proteins and peptides to yield oligopeptides and free amino acids. The hydrolysis process may be conducted at a temperature range of about 48° C. to 60° C. (about 120° F. to 140° F.), which accelerates enzymatic activity but does not result in denaturation of the protease enzymes. The chamber 201 may include a heating element 203, which may be a steam heater or other heating element, such as a heating coil, a heating jacket, or other heating mechanism. The proteases utilized in the presently disclosed methods may be bacterial proteases, such as thermophilic bacterial proteases having higher temperature resistances, such as bromolain, papain, papain-like proteases, subtilisin, trypsin, thermolysin, protease K, renin, leucine amino peptidase, and combinations thereof. The reaction may be conducted for a period of about 2 hours to about 4 hours, which is sufficient for substantial enzymatic hydrolysis of proteins. The enzymatic digestion may reduce the size range of the peptides to about 500 Daltons to about 1000 Daltons. In the resulting composition, 80% of the total peptides may have a size of less than 2000 Daltons. In some embodiments, the solid fraction may be added to the reaction chamber or may be placed in a second reaction chamber under the same conditions. In such embodiments, the remaining proteins and peptides in the solid material may be hydrolyzed as well. A resulting hydrolysate mixture may be mechanically separated into solid and liquid portions in a second separation process.

In embodiments in which the solid materials yielded from the extract step are hydrolyzed, a second separation process (Step 6) may be conducted during which the hydrolysate mixture of Step 4 may be mechanically separated by separation apparatus 210. The separation apparatus 210 may be a centrifuge, such as a decanter centrifuge or other centrifugation or separation apparatus as discussed herein. The solid fraction may be composed of undissolved plant fibers, residual plant material, and some limited residual proteins and peptides. The liquid fraction contains water, dissolved oligopeptides and amino acids, alkaline agents (e.g., calcium hydroxide), and other soluble components from the plant material, which may include isoflavonoids, isoflavones, phytoalexins, phenols, phytosulfokines, carbohydrates, and other compounds. The solid fraction from the second separation process may be collected from the separation apparatus for later filtering and the liquid hydrolysate fraction may be collected for a further hydrolysis process.

After the second separation (Step 6), the separated liquid hydrolysate may be collected for further hydrolysis. The solid portion from the second separation is collected for further separation step (Step 7) in a filtering apparatus 310. The filter system 310 may be a filter press. In other implementations, the filter apparatus 310 a rotary drum filter or a vacuum filtration technique can be considered. The second solid fraction may be loaded into the filter system 310, where it is subjected to high pressure, forcing the remaining liquid to permeate through the filter material (e.g., cloth), leaving the solid material behind. This third separation step allows for extraction of finer particles and provides a more thorough separation, ensuring a higher purity of a second liquid hydrolysate extracted by the filter apparatus 310.

The first and second liquid hydrolysates extracted from separation steps (Steps 6 and 7) may be combined into a combined liquid hydrolysate. The combined extract may optionally undergo further hydrolysis treatment to enhance its composition and effectiveness as a fertilizer. The combined extract may be passed through a steam heater 304, which can serve to further concentrate the extract by reducing its water content. The combined extract can be transferred to a reaction chamber 301 for further processing.

In Step 8, a second hydrolysis step is conducted in which the reaction chamber 301 heats the combined extracts to a temperature range of about 48° C. to about 60° F. (120° F. to about 140° F.). The process is conducted at a controlled pH of about 8 (e.g., about pH 7.8 to about pH 8.2, or any range of values therein), which is maintained to ensure an optimal environment for further hydrolysis of peptide bonds to occur without compromising the amino acid chemistry of the liquid extract. The duration of this heating step is approximately 2 hours, a carefully determined period that is long enough to achieve the further hydrolysis.

The temperature in the third reaction chamber 301 may be subsequently raised from 75° C. to about 90° F. (170° F. to about 190° F.) to denature the enzymes and terminate the enzyme hydrolyzation process. The denaturation process is conducted at a controlled pH of about 8 to about pH 9 (e.g., about pH 7.8 to about pH 9.2, or any range of values therein). The duration of this denaturation step is approximately 2 hours.

After the steps performed in the third reaction chamber 301, the combined liquid extracts may be processed through a concentrating system in Step 9. The concentrating system may be a forward osmosis, reverse osmosis, or other concentration technique may be performed, e.g., by a reverse osmosis system 401 combined liquid extract demineralizes and refines the final liquid extract composition. The pressure applied by the reverse osmosis system 401 efficiently removes clean water while concentrating the nitrogenous compounds. The reverse osmosis process is conducted at controlled temperatures and pressures, typically ranging from about 20° C. to about 30° C. (about 68° F. to about 86° F.) and 200 to 400 psi, to maintain the stability of the amino acids and prevent denaturation or degradation of the compounds. The result of Step 9 is a concentrated liquid hydrolysate, rich in amino acids, which forms a nitrogen-rich fertilizer composition. The concentrated liquid hydrolysate emerging from this process represents a high-value, environmentally friendly fertilizer product, suitable for various agricultural applications. The nitrogen-rich, filtered hydrolysate having a nitrogen content by weight of about 2% to about 12%.

In some implementations, the combined liquid extracts may be filtered prior to being processed through the reversed osmosis system. A filter step may be performed to remove any residual plant materials, precipitates, or other undissolved materials to clarify the combined liquid extract prior to reverse osmosis. This additional filtration step may be performed using a filter press, a rotary drum filter, or a vacuum filtration technique. The filtered combined extract may then be processed in Step 9 with the concentrating system.

In some implementations, the amino acid-rich composition produced by the concentrating system may be subsequently dried to yield a dry, powder amino acid composition that can be used in a dry fertilizer composition or combined with other components in a dry fertilizer composition. The drying apparatus may be a rotary evaporator, a vacuum evaporator, a falling film evaporator, a spray dryer, or a freeze dryer.

In some implementations, the present method may include a Step 10 in which a drying process is applied to the solid plant material remaining after the filtration process (e.g., press filtration). This drying step may be conducted using a flash drying system 510, which is particularly effective for rapidly reducing moisture content (e.g., from about 5% to about 15% water w/w) while preserving the integrity of the plant material. In drying step, the solid material is exposed to a high-velocity hot gas stream, typically at temperatures ranging from about 150° C. to about 200° C. (about 302° F. to about 392° F.). This rapid drying method is efficient in removing moisture without significantly degrading the nutritional and chemical properties of the plant material.

Once dried, the material may then be transferred to a pellet mill 601 for a pelletizing step (Step 11). In the pellet mill 601, the dried plant material may be compressed into small, dense pellets. This pelletizing process may involve the application of pressure and heat, typically in the range of about 70° C. to 90° C. (about 158° F. to 194° F.), to facilitate the binding of the particles. The resulting pellet fertilizer is characterized by its ease of handling, storage, and application, making it a practical and efficient option for agricultural use. The utilization of the by-products of the liquid fertilizer production provides sustainable agricultural practices. The resulting dried composition may include about 10% to about 50% w/w free amino acids and oligopeptides, and/or one or more additional ingredients, such as isoflavones, phytoalexins, phenols, phytosulfokines, and derivatives thereof (e.g., alkali salts, etc.).

Organic Nitrogen Fertilizers

The amino acids, oligopeptides, and other nitrogenous compounds produced by the foregoing methods can be included in organic fertilizers that are compliant with NOP and other agency standards for use in organic farming. The amino acids and oligopeptides produced by the foregoing methods may be mixed with various additional organic-compliant ingredients to produce a balanced organic nitrogen fertilizer.

In some embodiments, and without limitation, a fertilizer composition may include a liquid composition that includes about 2% to about 12% free amino acids and oligopeptides w/w (e.g., 4% w/w to about 10% w/w, or any value or range of values therein), and/or one or more additional ingredients. In some embodiments, the organic fertilizers may include one or more additional compounds that enhance plant growth. These additional organic compounds may include one or more of isoflavones, phytoalexins, phenols, phytosulfokines, and salts thereof. In some implementations, the composition may include isoflavones in a concentration range of about 0.01% w/w to about 0.2% w/w (e.g., about 0.05% w/w to about 0.15% w/w, or any value or range of value therein). In some implementations, the composition may include phytoalexins in a concentration range of about 0.0001% w/w to about 0.002% w/w (e.g., about 0.0005% w/w to about 0.0015% w/w, or any value or range of value therein). In some implementations, the composition may include phenols in a concentration range of about 0.001% w/w to about 0.015% w/w (e.g., about 0.005% w/w to about 0.01% w/w, or any value or range of value therein). In some implementations, the composition may include phytosulfokines in a concentration range of about 0.0001% w/w to about 0.002% w/w (e.g., about 0.0005% w/w to about 0.0015% w/w, or any value or range of value therein).

The organic fertilizers may include one or more weak organic acids or salts thereof (e.g., polyprotic organic acids or salts thereof), such as citric acid, malic acid, fumaric acid, salts of such organic acids, and combinations thereof. The organic acids must be from organically-compliant sources (e.g., OMRI compliant) Citric acid may be preferred due to its tri-protic chemistry and superior buffering capabilities. Other simpler organic acids, such as acetic acid salts of such organic acids may be used as well. The pH may be maintained in a range around neutral pH, such as between about pH 6 and pH 8 (e.g., from about pH 6.5 to about pH 7.5). To balance the pH of the liquid fertilizer, the liquid fertilizer may include one or more organic acids.

In some embodiments, and without limitation, a dry fertilizer composition that includes about 90% free amino acids and oligopeptides w/w (e.g., 10% w/w to about 25% w/w, or any value or range of values therein), and/or one or more additional ingredients. In some embodiments, the organic fertilizers may include one or more additional compounds that enhance plant growth. These additional organic compounds may include one or more of isoflavones, phytoalexins, phenols, phytosulfokines, and salts thereof. In some implementations, the composition may include isoflavones in a concentration range of about 0.05% w/w to about 1% w/w (e.g., about 0.15% w/w to about 0.45% w/w, or any value or range of value therein). In some implementations, the composition may include phytoalexins in a concentration range of about 0.0005% w/w to about 0.01% w/w (e.g., about 0.0015% w/w to about 0.005% w/w, or any value or range of value therein). In some implementations, the composition may include phenols in a concentration range of about 0.005% w/w to about 0.05% w/w (e.g., about 0.015% w/w to about 0.035% w/w, or any value or range of value therein). In some implementations, the composition may include phytosulfokines in a concentration range of about 0.0005% w/w to about 0.01% w/w (e.g., about 0.001% w/w to about 0.0075% w/w, or any value or range of value therein). An organic fertilizer composition of the present invention may also include additional components routinely used in the art, for example, humectants, adjuvants, antioxidants, stabilizers, plant macronutrients, plant micronutrients, and combinations thereof.

CONCLUSION/SUMMARY

The present invention provides organic nitrogen fertilizer compositions and methods of making the same. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. A method of producing a liquid nitrogen fertilizer from organic material, comprising:
    a. performing an extraction process on a slurry of plant material in water at a predetermined temperature and alkaline pH range for a predetermined period;
    b. separating a first liquid portion of the slurry from solid material in said slurry;
    c. performing an enzymatic digestion step on the first liquid portion using one or more proteases at a predetermined temperature and pH range for a predetermined period to produce a first hydrolysate; and
    d. concentrating the first hydrolysate to yield a nitrogen-rich fertilizer composition including about 2% to about 12% w/w free amino acids.

2. The method of claim 1, further comprising subjecting the plant material to a defatting process to yield defatted organic material prior to preparing said slurry and creating a slurry of the defatted organic material.

3. The method of claim 1, further comprising performing a hydrolysis step on solid material removed from the extraction step in water at a predetermined temperature and pH range for a predetermined period.

4. The method of claim 3, further comprising separating a second liquid hydrolysate of the resulting hydrolysis product of the hydrolysis step.

5. The method of claim 4, further comprising combining the first hydrolysate with the second hydrolysate, placing the combined hydrolysates in a chamber and heating the composition at a predetermined pH, at a predetermined temperature, and for a predetermined period of time to further hydrolyze peptides present in the combined hydrolysates.

6. The method of claim 4, further comprising passing the combined the first and second hydrolysates through an osmosis system to remove clean water and provide a concentrated hydrolysate extract that provides an amino acid rich composition.

7. The method of claim 1, wherein the plant material is selected from a group consisting of soy beans, soy bean products, clover, duckweed, cottonseed, lentils, chickpeas, Spirulina, hemp seeds, chia seeds, and alfalfa.

8. The method of claim 1, further comprising the steps of:
   a. drying the solid material removed from the extraction step;
   b. placing the dried solid plant material into a pellet mill; and
   c. producing a separate pellet fertilizer from the dried solid plant material.

9. The method of claim 1, wherein the composition comprises isoflavones in a range of about 0.01 w/w to about 0.2% w/w.

10. The method of claim 1, wherein at least 50% of the composition is composed of free amino acids and oligopeptides of less than 2000 Da.

11. The method of claim 1, wherein said composition comprises phytoalexins and phenolic compounds that provide a synergistic enhancement in nitrogen-use efficiency in a plant to which the fertilizer composition is applied.

12. A method for producing a concentrated amino acid fertilizer from an enzymatic hydrolysate of proteinaceous plant material, comprising:
   a. performing an extraction process on a slurry of plant material in water at a predetermined temperature and alkaline pH range for a predetermined period;
   b. separating a first liquid portion of the slurry from solid material in said slurry;
   c. hydrolyzing the first liquid portion derived from the plant material by adding protease enzymes, at a temperature in a range of about 48° C. to about 60° C., and at a pH in a range of about 8 to about 9; and
   d. heating the resulting hydrolysate to a temperature in a range of about 75° C. to about 90° C. to deactivate the protease enzymes.

13. The method of claim 12, further comprising subjecting the hydrolysate to a reverse osmosis process to remove water and concentrate the nitrogenous compounds.

14. The method of claim 12, recovering the concentrated liquid fertilizer containing about 2% to about 12% amino acids by weight.

15. The method of claim 12, further comprising adding organic acids to stabilize the pH of the concentrated liquid fertilizer in a range of about 6.5 to about 7.5.

16. A method of producing a liquid nitrogen fertilizer from organic material, comprising:
   a. performing a non-enzymatic extraction process on a slurry of plant material in water at a predetermined temperature and alkaline pH range for a predetermined period;
   b. separating a first liquid portion of the slurry from solid material in said slurry;
   c. performing an enzymatic digestion step on the first liquid portion using one or more proteases at a predetermined temperature and pH range for a predetermined period to produce a first hydrolysate; and
   d. concentrating the first hydrolysate to yield a nitrogen-rich fertilizer composition including about at least 50% w/w of the composition consists of free amino acids and oligopeptides of less than 2000 Da.

17. The method of claim 16, further comprising subjecting the plant material to a defatting process to yield defatted organic material prior to preparing said slurry and creating a slurry of the defatted organic material.

18. The method of claim 16, further comprising performing a hydrolysis step on solid material removed from the extraction step in water at a predetermined temperature and pH range for a predetermined period.

19. The method of claim 18, further comprising separating a second liquid hydrolysate of the resulting hydrolysis product of the hydrolysis step.

20. The method of claim 19, further comprising combining the first hydrolysate with the second hydrolysate, placing the combined hydrolysates in a chamber and heating the composition at a predetermined pH, at a predetermined temperature, and for a predetermined period of time to further hydrolyze peptides present in the combined hydrolysates.

* * * * *